INVENTOR.
DANIEL H. McKEOUGH
BY
OSTROLENK, FABER, GERB & SOFFEN
ATTORNEYS

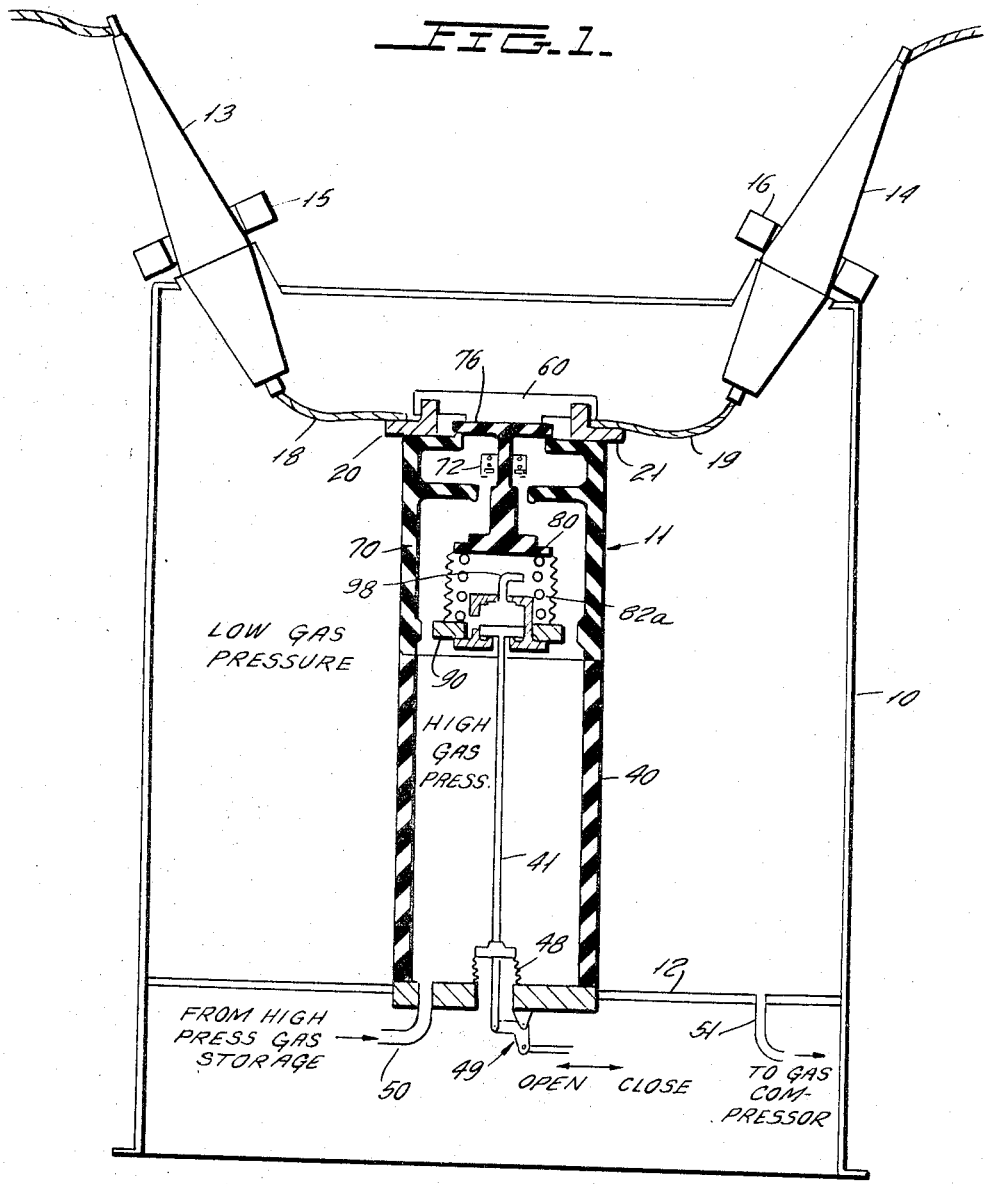

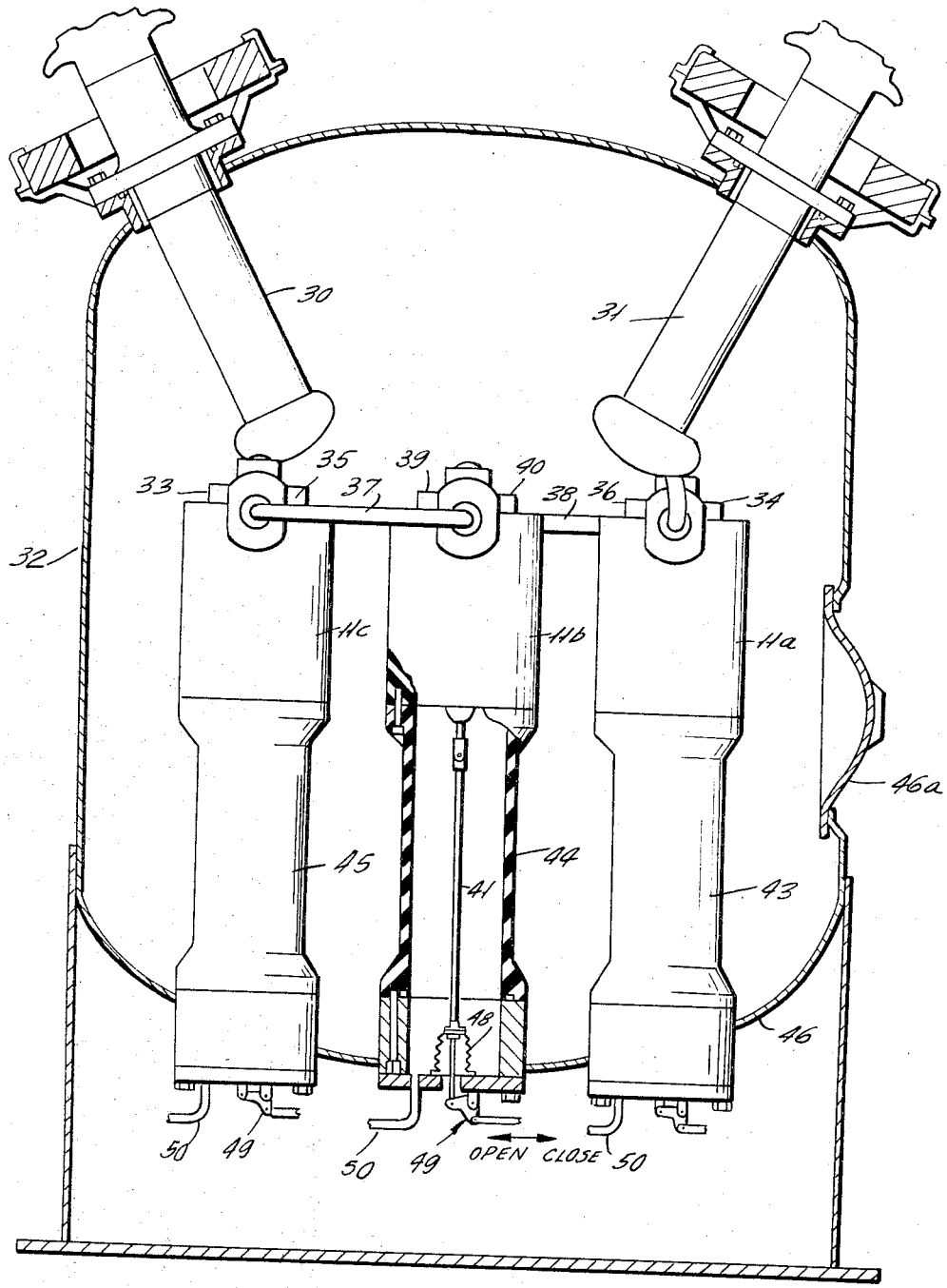

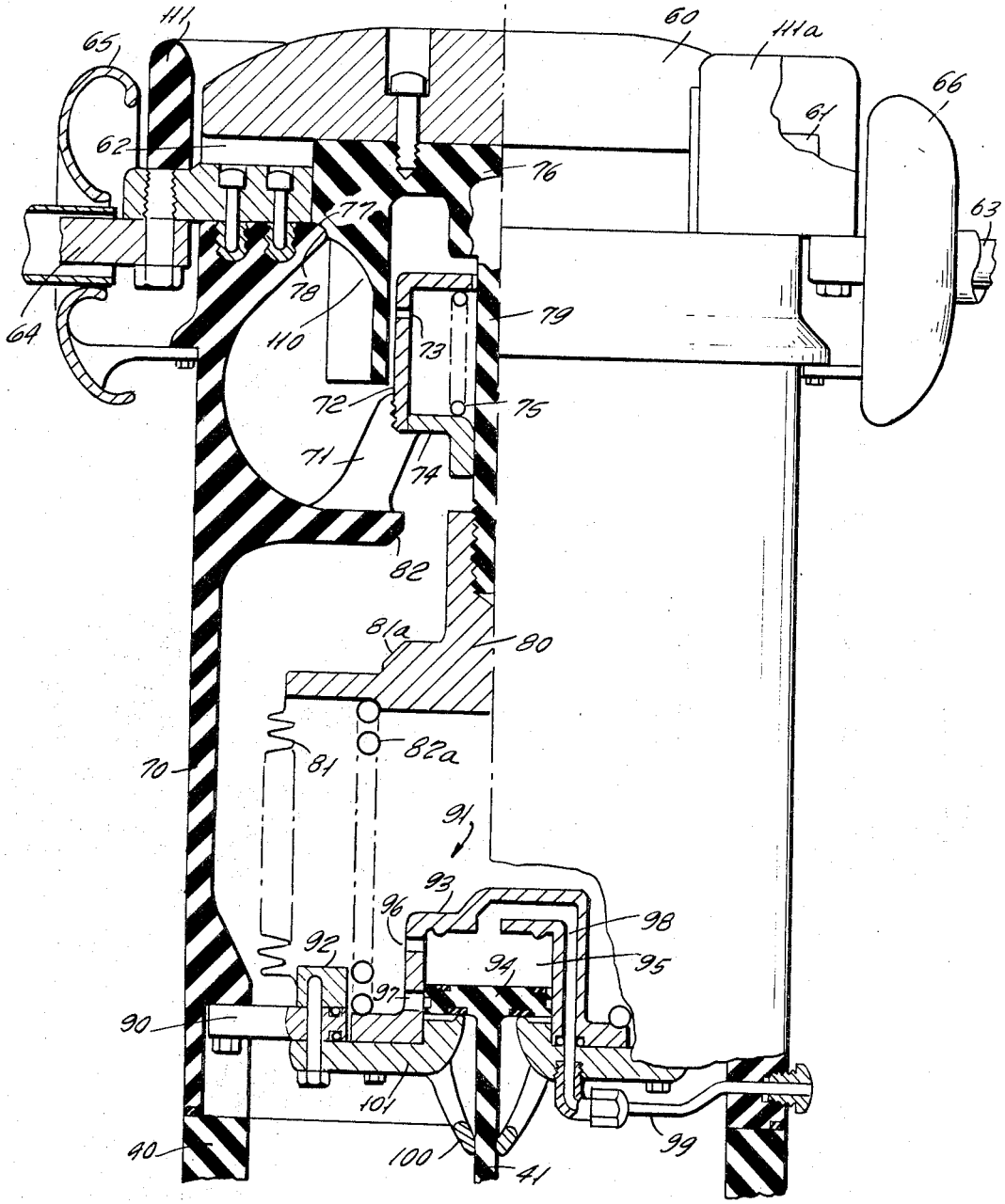

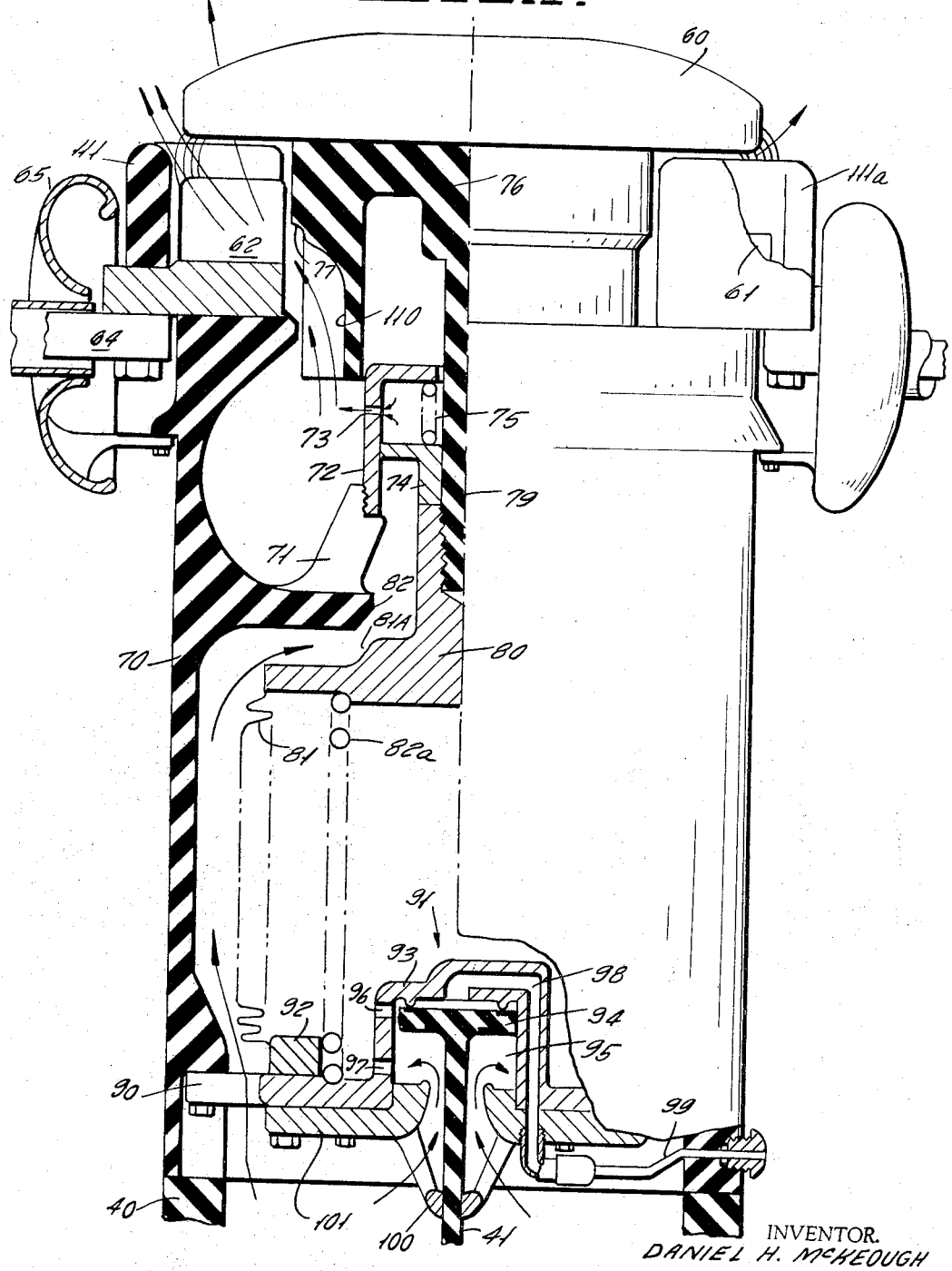

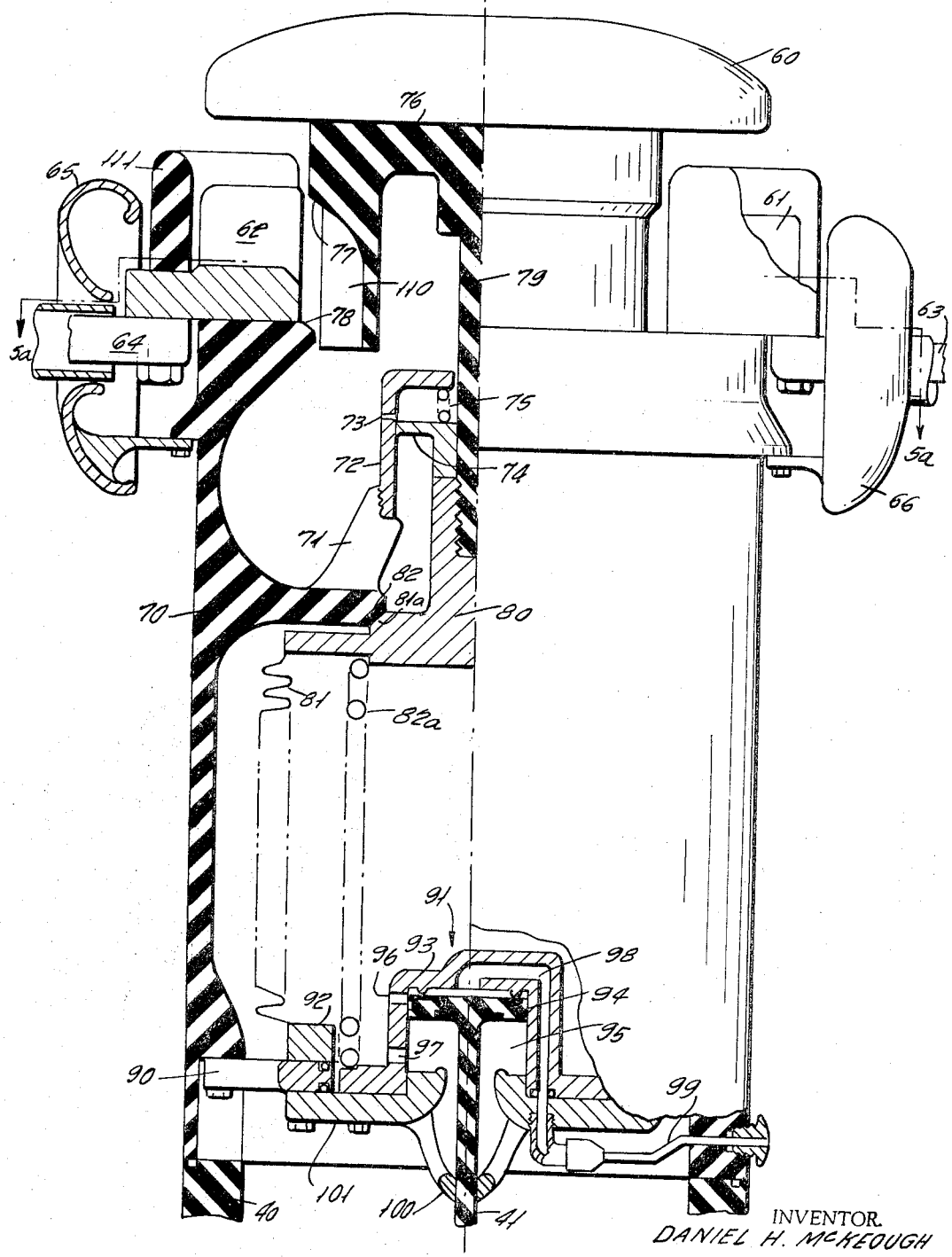

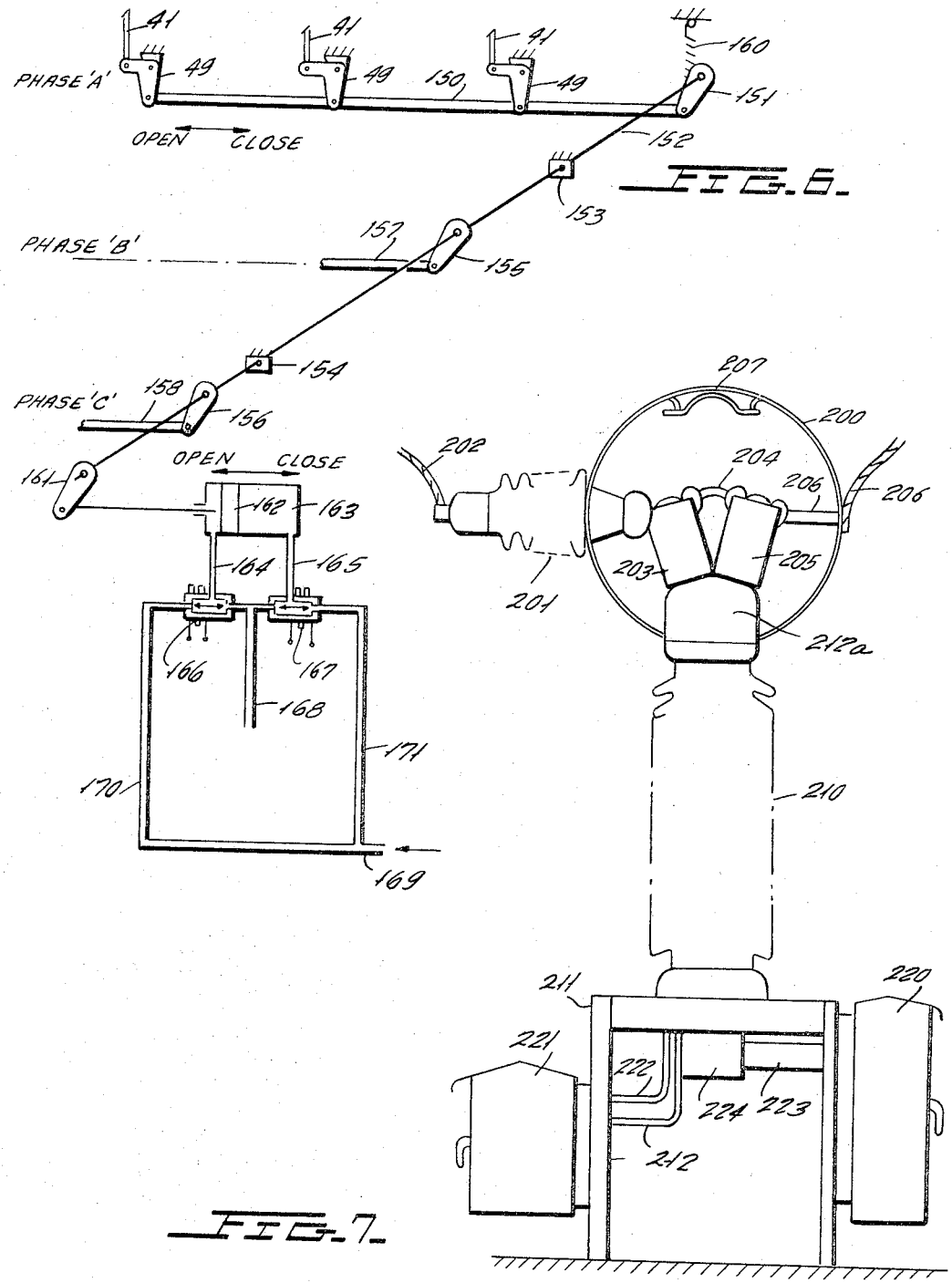

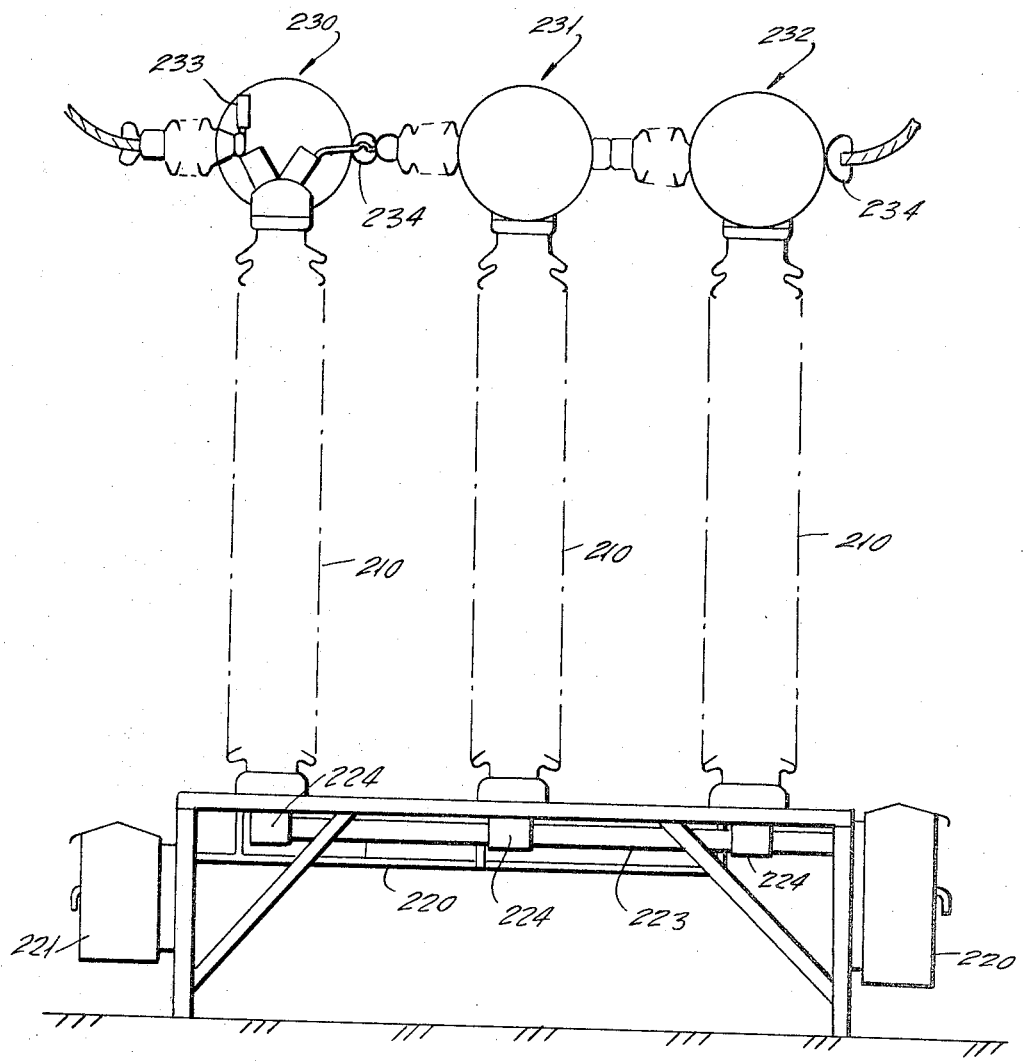

United States Patent Office 3,350,528
Patented Oct. 31, 1967

3,350,528
DUAL PRESSURE GAS CIRCUIT BREAKER HAVING MOVABLE BRIDGING CONTACT CONNECTED TO BLAST VALVE AND CUT-OFF VALVE WHICH ARE UPSTREAM OF THE MOVABLE CONTACT
Daniel H. McKeough, Ludvika, Sweden, assignor to I-T-E Circuit Breaker Company, Philadelphia, Pa., a corporation of Pennsylvania
Filed Sept. 4, 1964, Ser. No. 394,864
14 Claims. (Cl. 200—148)

ABSTRACT OF THE DISCLOSURE

A high voltage gas blast circuit breaker having a pair of stationary contacts bridged by a movable contact. A blast valve is fixed beneath the movable contact and a downwardly extending portion thereof is connected to a cut-off valve. The regions of engagement between the movable contact and stationary contacts are surrounded by gas directing baffles which direct high pressure gas generally perpendicularly through the arc drawn between the contacts. The interrupter structure is carried on a high pressure cylinder and within a low pressure tank so that when the blast valve is opened, high pressure gas passes from the cylinder, through the arc drawn by the contacts, and into the low pressure region. The movable contact is temporarily held in a most favorable spaced position with respect to the stationary contacts during interruption by means of a dashpot, with the movable contact subsequently moving to a greater spaced position after interruption.

This invention relates to circuit breakers, and more specifically relates to a novel dual-pressure gas circuit breaker which is extremely effective for the switching and control of normal and abnormal currents in relatively high voltage power circuits.

In accordance with the invention, a novel circuit breaker is provided with an interrupter which is mounted inside a tank which may be metallic and, in some cases, may be electrically connected to ground. This tank then contains compressed gas at a relatively low operating pressure. The interrupter and its support column of insulation material are then filled with gas at a relatively high pressure and incorporate a novel valve arrangement attached to the movable bridging contacts of the interrupter which is so arranged that the opening of the valve permits high pressure gas to blast across two series arcs during interruption and into the low pressure space within the tank.

The novel interrupter of the invention utilizes a cross-blast interrupting arrangement rather than the commonly used axial or radial blast, as with present high voltage compressed gas circuit breakers.

In the axial blast type device, part of the arc will be drawn on the upstream side of the nozzle so that on current crests, the arc energy released on the upstream side increases the specific volume of gas before it reaches the nozzle and thus reduces the mass rate of flow. This tends to limit the performance of the device. With the novel interrupter of the invention, and using the crossblast interrruption concept, the arc is not drawn on the upstream side so that the device is inherently better suited for heavy short-circuit currents. The blast valve skirt of the invention is then provided with gas flow passages built therein, with stationary contact fingers and arc baffle members which force the gas to flow across the arc column. Moreover, the strong magnetic effect of two parallel arcs spaced relatively close to one another serve to positively position the arc.

The device further incorporates a novel arc baffle which confines the arc and minimizes so-called "arc looping." The downstream side of the arc, in view of the cross-blast arrangement, does not now require the use of solid insulation material. This removes the problem of restrike across the solid insulation when contaminated by arc products.

Moreover, the novel arrangement permits the use of two series connected breaks in a compact structure, thus making it possible to reduce the space requirements while maintaining adequate electrical clearance.

The movable contact of the invention is secured directly to the blast valve whereby it is impossible to open the contacts without getting a blast of gas through the arcing space. The novel device moreover is used in a two-step opening operation, as will be seen more fully hereinafter, to assist in controlling the gas flow and arc looping. Moreover, this arrangement minimizes overvoltages produced on low power factor circuits.

The blast cut-off valve then serves to stop the flow of high pressure gas when the contact reaches the isolating position.

The insulator support columns, which are arranged to hold high pressure gas, eliminate the need for large high pressure storage reservoirs either at ground potential or at the potential of one of the terminals of the device. This support column also stores the high pressure gas directly adjacent to the arc space and eliminates time loss in getting the gas to flow from some more remote point. The same gas which is used as an interrupting fluid is further used to move all control parts, even when an electro-negative gas, such as sulphur-hexafluoride is used. This, of course, eliminates the need for a separate operating mechanism and operating fluid.

Further, in accordance with the invention, all rotating and sliding seals in the tank wall are eliminated, thus minimizing the possibility of gas leakage.

As a further feature of the invention, a novel arrangement of an interrupter bellows and control valve which is closely coupled to the blast valve and moving contact increases the speed of operation and simplifies the mechanical arrangement.

Finally, the same device may be used with various gases, depending upon the application of the device. That is to say, compressed air may be used for low voltage, low interrupting capacity applications, while sulphur-hexafluoride may be used for high voltage, high interrupting capacity applications.

Accordingly, the primary object of this invention is to provide a novel high voltage, high power interrupter structure.

Another object of this invention is to provide a novel high voltage interrupter structure which utilizes a cross-blast interrupting arrangement.

Yet another object of this invention is to provide a novel gas blast interrupter wherein the interrupting fluid further serves to drive the operating mechanism of the device.

Another object of this invention is to provide a novel interrupter structure wherein the interrupter is held at a high pressure while the tank within which the interupter is immersed is at low pressure.

A further object of this invention is to provide a novel simplified structure for high voltage interruption purposes.

Yet another object of this invention is to provide a novel high voltage gas blast circuit breaker in which gas leakage through the tank wall is minimized.

A still further object of this invention is to provide a novel gas blast interrupter structure which has increased operating speed.

These and other objects of this invention will become apparent from the following description when taken in connection with the drawings, in which:

FIGURE 1 is a schematic section through a one-pole unit using one interrupter per pole within a low pressure housing.

FIGURE 2 illustrates the manner in which the circuit breaker of FIGURE 1 can be provided with three series connected interrupters for a single pole which are used for higher operating voltages such as a 230 kv. system.

FIGURE 3 is a partial cross-sectional diagram of the interrupter structure used in FIGURES 1 or 2 with the interrupter contacts closed.

FIGURE 4 is similar to FIGURE 3 and illustrates the initial operation of the contacts to their disengaged position with cross-blast action proceeding.

FIGURE 5 is similar to FIGURES 3 and 4 and illustrates the contacts in their fully open position.

FIGURE 6 schematically illustrates the control system for a three-pole breaker unit.

FIGURE 7 shows a schematic section through a single pole unit wherein the tank housing is mounted at line potential, while the control and gas supply system is at ground potential.

FIGURE 8 shows a single-phase three-pole breaker suitable for operation at voltage from approximately 345 to 500 kv. mounted in accordance with the present invention.

Referring first to FIGURE 1, I have schematically illustrated therein a tank 10 which has an interrupter structure 11 mounted on a wall 12 which extends across the bottom of tank 10. The bottom of tank 10 may then be secured directly to ground or can be insulated from ground in any desired manner.

Figure 3A:
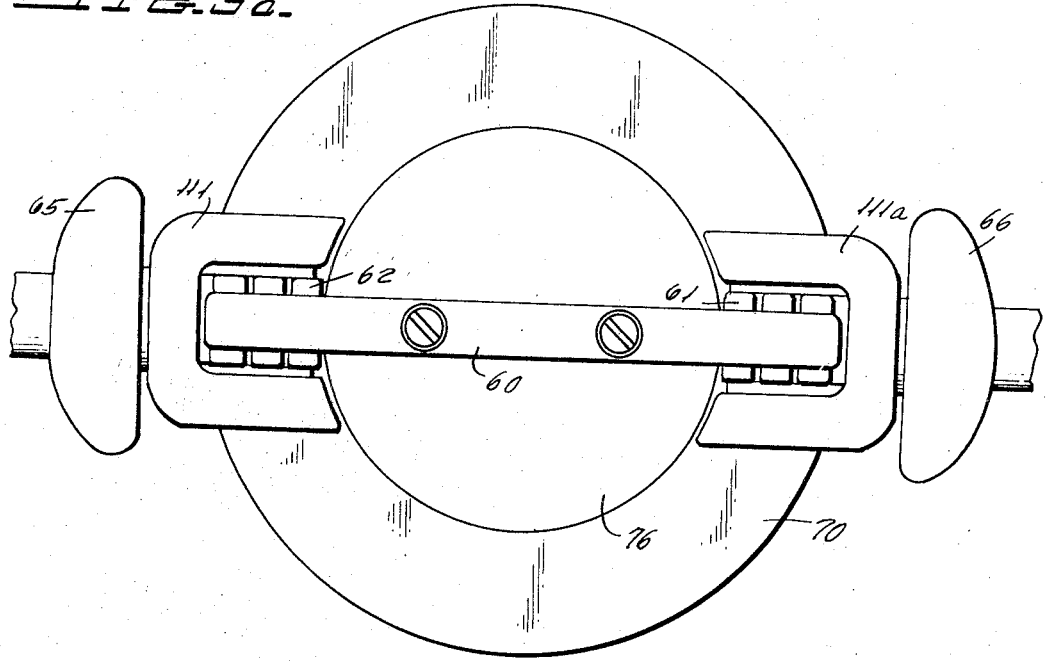
FIGURE 3a is a top view of FIGURE 3.
Figure 5A:
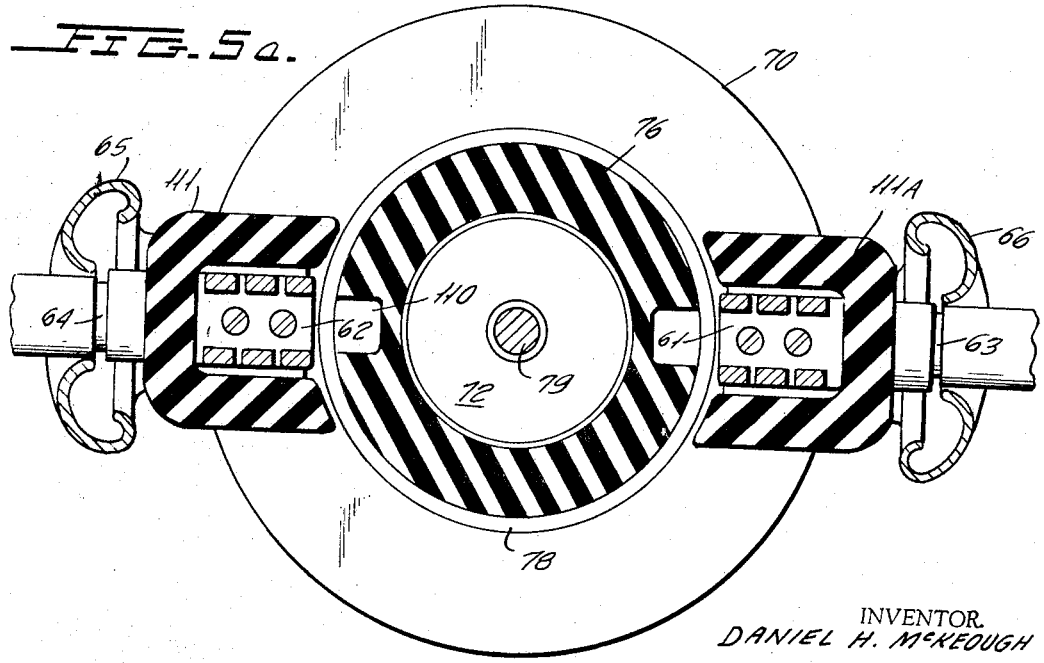
FIGURE 5a is a cross-sectional view of FIGURE 5 taken across lines 5a—5a in FIGURE 5.

Two terminal bushings 13 and 14 then extend through the upper part of tank 10 and through ring-type current transformers 15 and 16 respectively. Electrical conductors 18 and 19 then extend from bushings 13 and 14 to the stationary contacts 20 and 21 of the interrupter 11. Details of the structure of interrupter 11 will be given more fully hereinafter with reference to FIGURES 3, 4 and 5.

FIGURE 2 which schematically illustrates the manner in which the one-pole unit of FIGURE 1 having a single interrupter may be adapted with three series connected interrupters 11a, 11b and 11c which may each be identical to interrupter 11 of FIGURE 1. Thus, in FIGURE 2, suitable terminal bushings 30 and 31 secured to the top of tank 32 are suitably connected to the stationary contacts 33 and 34 of interrupters 11c and 11a respectively.

Stationary contacts 35 and 36 of interrupters 11c and 11a respectively are then connected to conductors 37 and 38 which are, in turn, connected to stationary contacts 39 and 40 respectively of interrupter 11b.

The single interrupter unit of FIGURE 1 may be designed to operate most efficiency at one level of operating voltage interrupting current and load current. By way of example, the unit of FIGURE 1 would preferably operate at 69 kv. line-to-line voltage, 2,000 ampere load current and 66,000 ampere interrupting current.

Where these requirements are increased, it is only necessary to use the identical interrupters in a series arrangement, as illustrated in FIGURE 2. Thus, two interrupters may be connected in series to achieve ratings of 115 kv. line-to-line voltage, 10,000 mva., 2,000 ampere load current.

This same arrangement could be extended to operate at 138 kv. at 15,000 mva. and 2,000 ampere load current. When, however, the requirements are extended to, for example, 230 kv. line-to-line voltage at 20,000 mva. and a 2,000 ampere load current, the arrangement of FIGURE 2 would be utilized having the three interrupters 11a, 11b and 11c connected in series.

Referring now to the interrupter structure 11 of FIGURE 1, it will be seen that the interrupter structure 11 is mounted on a hollow support insulator 40 which is carried on base 12. The joints at either end of insulator 40 are provided with suitable gas tight seals and an insulated operating rod 41 passes through insulator 40.

In a similar manner, in FIGURE 2, the interrupters 11a, 11b and 11c are mounted on hollow insulation supports 43, 44 and 45 which are carried in the bottom 46 of the tank with suitable insulated operating rods extending through the hollow tubes 43, 44 and 45, as illustrated by operating rod 41 in column 44.

It will be further noted that the tank in FIGURE 2 is provided with a manway 46a which can be removed after the pressure within tank 32 is equalized to atmospheric pressure so that maintenance personnel can enter the tank to perform whatever maintenance operation or inspection is necessary.

The operating rod 41 in FIGURES 1 and 2 passes through the support bottom wall of the tank through a tank bellows seal 48 which is connected to a suitable operating mechanism 49 which will be described more fully hereinafter.

A high pressure gas supply pipe 50 which is connected to a suitable high pressure gas storage system is then connected to the interior of the support column 40 in FIGURE 1 and columns 43, 44 and 45 in FIGURE 2. A low pressure gas supply line 51 (FIGURE 1) then extends from the main body of tank 10 to a suitable gas compressor unit. Clearly, a similar low pressure gas supply will be provided for the interior of tank 32 of FIGURE 2.

The interrupters of FIGURES 1 and 2, as indicated previously, are identical and are shown, for example, in FIGURES 3, 4 and 5 in the closed, arcing, and fully open position respectively.

Referring now to FIGURES 3, 3a, 4, 5 and 5a, I have illustrated therein an interrupter which is comprised of a main bridging contact 60 which is movable between an engaged position and disengaged position with respect to stationary contacts 61 and 62. Note that stationary contacts 61 and 62 correspond to stationary contacts 21 and 20 respectively of FIGURE 1 and contacts such as contacts 34 and 36 respectively in FIGURE 2. Electrical connection is made to the stationary contacts 61 and 62 by the conductors 63 and 64 respectively which are bolted to suitable threaded openings in contacts 61 and 62, the conductors 63 and 64 corresponding to conductors 19 and 18 respectively in FIGURE 1.

Corona shields 65 and 66 surround conductors 64 and 63 respectively to reduce electrical stress at the connection points.

Stationary contacts 61 and 62 are then mounted directly atop the insulation interrupter body 70. Body 70 is further provided with an extending arm 71 which carries a dashpot housing 72 which has an orifice 73 therein and receives piston 74 and biasing spring 75. A blast valve member 76 of insulation material is then carried from bridging contact 60 and has a valve surface 77 which is movable into engagement with a cooperating valve surface 78 on the housing 70. A central extension 79 from the blast valve 76 is then threadedly received by a cut-off valve body 80 which has a valve surface 81a which is movable into and out of engagement with valve surface 82 extending from housing 70. The external diameter of cut-off valve 80 is then secured to a bellows 81 which contains an operating spring 82a.

The lower end of interrupter housing 70 is sealed off by means of a support platform 90 extending thereacross and which carries the control valve structure 91. The platform 90 serves to receive the end of bellows 81 by the sealing ring 92 and further serves to receive the lower end of operating spring 82a.

The control valve 91 is then seen to be comprised of a housing 93 which receives the enlarged piston shaped end 94 of operating rod 41. More specifically, piston 94 is movable within the chamber 95 from the lower position of FIGURE 3 to the upper position of FIGURES 4 and 5; suitable gasketing means and raised valve seats being provided within chamber 95 to achieve sealing at the upper and lower positions, as shown.

Two orifices 96 and 97 are then provided in housing 93, as shown. A channel 98 is then formed in housing 93. The channel 98 is then connectable to areas external of housing 70 by means of the conduit 99 which extends through the walls of housing 70. Note that a support guide means 100 extends from disk shaped member 101 which is secured to platform 90 and which in turn serves to support housing 93. The disk shaped member 101 aids in the support and guidance of the rod 41.

It is now possible to consider the operation of the interrupter of FIGURES 3, 4 and 5.

In the breaker closed position of FIGURE 3, the bridging contact 60 engages stationary contacts 61 and 62 so that current flow occurs from conductor 63 to conductor 64. Bridging contact 60 is held closed against the opening force of operating spring 82a and the upward force on blast valve 76 by virtue of the larger downward force exerted on the upper surface of cut-off valve 80. That is to say, the pressure on the external surface of cut-off valve 80 is a high pressure, whereas the internal pressure in cut-off valve 80 is at low pressure, since this pressure is connected through orifice 96, channel 98 and conduit 99 to the areas external of the interrupter which are at low pressure. Note that in this position the operating rod 41 is in its lowermost position.

The rod 41 is, in turn, held in its lowermost position shown in FIGURE 3 by virtue of the differential pressure across bellows 48 of FIGURE 1 which is higher on the interior of insulation column 40 than beneath the support panel 12 which is at low pressure. In addition to this, positive mechanical forces are applied to toggle system 49 to insure the downward position of rod 41.

In order to open the interrupter, the rod 41 is moved upwardly by its operating mechanism, as will be described more fully hereinafter. This moves piston 94 to its uppermost position, as shown in FIGURE 4, to shut off the venting channel 98 and to permit high pressure gas to flow from the interior of column 40 through the opening defined about guide member 100, through orifice 96, then into the interior of bellows 81. This forces the cut-off valve 80, connecting rod 79, blast valve 76 and bridging contact 60 upwardly with a high acceleration because of the relatively large force exerted on the under side of the cut-off valve 80 by the operating spring 82a.

Two series connected arcs, as schematically illustrated by the lines in FIGURE 4, are drawn as soon as contact 60 disengages stationary contacts 61 and 62 and, since the blast valve 77 has opened, high pressure gas is blasted across the arcing regions and out into the interior of the tank, the blast gases taking the direction shown by the arrows of FIGURE 4. Consequently, when a current zero occurs for the alternating waveform, both series arcs will be interrupted.

The dashpot system 74 will be noted as stopping the opening motion of contact 60 when a relatively short gap distance is achieved. This timing can be adjusted by control of the size of the orifice 73 in housing 72. Preferably, a short gap distance is held for approximately two cycles where the air leaking through orifice 73 thereafter, permits a continued opening motion of contact 60 to its full gap distance, as shown in FIGURE 5.

The use of the short, initial open gap is most suitable for the interruption of large currents, since it minimizes arc looping and reduces arc voltage. It is also useful for the interruption of small currents on a low power factor circuit because it limits the overvoltage produced during interruption. The long gap opening of FIGURE 5 is most suitable for isolation of the circuit after interruption.

Once the movable contact 60 reaches the top of its stroke, as shown in FIGURE 5, the blast cut-off valve seats 81a and 82 engage to prevent further escape of high pressure gas into the tank. A suitable gas supply unit (not shown) then restores the density of the gas inside the column to its correct value.

The control valve 94 will be noted as being held positively open when the contact 60 is in the breaker open position because the force exerted upwardly beneath piston 94 by the differential pressure thereacross will exceed the force on the tank seal bellows 48 which holds the operating rod 41 in position. The operating linkage 49 is then held in the breaker open position by a suitable toggle mechanism which will be described.

In order to now close the circuit breaker from the position of FIGURE 5, the operating rod 41 is moved downwardly by its operating linkage, thus permitting high pressure gas to escape from the interior of the operating bellows 89. As explained above, the resultant force on the blast valve 81 and bridging contact 60 will now exceed the upward force so that the assembly is driven downward toward the breaker-closed position. The control valve piston 94 is held downwardly and positively on its bottom seat, as explained previously.

Note that toward the end of the closing stroke and prior to the time the blast valve 76 will engage positively on its seat 78, there will be a short burst of high pressure gas applied between the contacts. This will minimize the effect of pre-strike currents when closing against heavy fault currents.

From the foregoing, it may be seen that the breaker can be held in either the closed or open position indefinitely without excessive gas leakage from between the high pressure and low pressure gas chambers, or from either to the external atmosphere. Moreover, this is done without keeping any control coils in an energized position and solely by the same gas used for the interrupting operation.

It is to be specifically noted that the blast valve 76 is provided with two diametrically opposing slots such as the slot 110 and another on the other side of the center line of the unit which are so arranged in relation to stationary contacts 62 and 63 that upon separation of the blast valve 76 and its seat 78, high pressure gas will be forced to escape into the space between the stationary contact fingers.

Arc baffles 111 and 111a (FIGURES 3a and 5a) which are made of a suitable insulation material having good arc-resistant properties is then so positioned about the stationary contact fingers that the arc is prevented from looping outward by virtue of the baffling action of members 111 and 111a.

At the same time, the high pressure gas is forced to escape through the relatively narrow slot formed by the periphery of bridging contacts 61 and 62 and their respective baffle members.

As mentioned above, the magnetic forces created during arcing tend to drive the arc towards the outer end of the bridging contact 60 and the opposing surfaces of the stationary contacts 61 and 62. At the same time, the kinetic energy of the high pressure gas will tend to drive the gas through this same space. Consequently, the gas is forced through the arc space in the region of highest current density.

FIGURE 6 illustrates a typical control arrangement for the interrupters when arranged as illustrated in FIGURE 2. More specifically, FIGURE 6 illustrates the toggle member 49 having operating rod 41 extending from one end thereof and a common operating rod 150 connected to each of the other ends thereof. The rod 150 is then connected to one end of crank 151 which is pivotally mounted on a shaft 152 which is secured by a suitable bearing arrangement 153 and 154. Since the unit of FIGURE 2 serves for a single pole, where a multipole unit is provided the other phases will have suitable output cranks 155 and 156 thereon which are connected to rods 157 and 158 which, in turn, are connected to the toggle member 49 of their respective interrupters.

The crank 151 may serve as one member of a suitable toggle linkage wherein tension spring 160 serves as the other half of the toggle. The shaft 152 is then connected to an output crank 161 which has its lower end connected to a piston 162 carried in a cylinder 163. The cylinder 163 then has one end thereof connected through a conduit 164 which is pressurized in order to close the breakers while the other end of cylinder 163 is connected to a conduit 165 which is pressurized in order to open the breakers.

The toggle linkage 151 and 160 is such that the toggle is normally in the locked position. In order to close the breaker, it is necessary to move piston 162 to the right so that the toggle is thrown off-center and tension spring 160 will cause rod 150 to travel rapidly to the right, thus opening each of the interrupters.

To this end, each of conduits 164 and 165 are connected to respective closing pilot valve 166 having an associated closing coil and a trip pilot valve 167 having its associated tripping coil. Each of valves 166 and 167 are then connected to conduit 168 which is, in turn, connected to atmosphere or to low pressure gas storage systems, while their other ends are each connected to conduit 169 through conduit 170 and 171 respectively to a high pressure gas storage system.

Accordingly, and in order to close the circuit breakers, the coil associated with pilot valve 166 is energized so that high pressure is applied to conduit 164 through conduit 170. This causes piston 162 to move to the right, thus rotating crank 161 in a counterclockwise direction and thus moving rod 150 to the right. In order to trip the unit, the coil associated with pilot valve 167 is energized, thus applying high pressure to conduit 165 and moving piston 162 to the left. This will cause crank 161 to rotate in a clockwise direction, thus moving rod 150 to the left to open the interrupters.

As previously indicated, the circuit breaker of the present invention may be used with various gases depending upon the voltage and short-circuit capacity of the system. For instance, for loads of moderate capacity, e.g., 25,000 amperes, compressed air may be used with a tank pressure of approximately 50 to 100 p.s.i.g., and an interrupting pressure of approximately 200 to 300 p.s.i.g.

For the same voltage range, but for higher interrupting currents, e.g., up to approximately 200,000 amperes, the interrupter pressure could be increased to 500 to 1500 p.s.i.g. For still higher operating voltages, e.g., 69 kv. to 600 kv., an electro-negative gas such as sulphur-hexafluoride or selenium-hexafluoride may be used to take advantage of their superior insulating and interrupting properties. This type gas may be used at approximately 35 p.s.i.g. tank pressure and 150 to 300 p.s.i.g. interrupter pressure.

Referring next to FIGURE 7, I have illustrated therein the manner in which the tank housing of the interrupters may be mounted at live potential with the control and gas supply mounted at earth potential. More specifically, as illustrated in FIGURE 7, I have illustrated therein a spherical housing 200 which has a bushing 201 secured thereto which is connected to a conductor 202. The bushing 201 extends internally of tank tank 200 and is connected to an interrupter 203 which is identical to one of the interrupters described with reference to FIGURES 3, 4 and 5.

The other stationary contact of interrupter 203 is then connected to conductor 204 which is, in turn, connected to a stationary contact of a second interrupter 205. The last stationary contact of interrupter 205 is then connected to conductor 206 which is, in turn, connected to the conductive housing of tank 200, the tank housing then being connected to output conductor 206. A manway 207 is then provided in the tank 200 so that access may be had to the interior of the tank.

It will be noted that the device of FIGURE 7 provides a total of four series connected breaks, two for each of interrupters 203 and 205. Thus, this device is suitable for operating at voltages in the range from 115 to 161 kv. Of course, three similar units could be used for a complete three-phase circuit breaker where the three units may or may not be mechanically connected.

The housing 200 is then mechanically supported on the hollow insulator column 210 which is, in turn, supported on a base frame structure 211. The interrupters 203 and 205 are then directly supported by a high pressure gas chamber 212a carried at the end of column 211 and supplied by high pressure within the hollow interior of column 210. The interior of tank 200 is then held at a relatively low pressure, as previously described, where this low pressure gas is fed through an insulated pipe such as conduit 212 which extends upwardly through insulator support 210 and to the interior of tank 200.

The equipment at ground potential then includes a housing 220 which may carry all of the various mechanical operating devices previously described, while the cabinet 221 serves as the gas supply cabinet having the conduit 212 and a high pressure conduit 222 extending therefrom. The conduit 222, of course, terminates on the interior of column 210.

The equipment heretofore described in FIGURE 6 is then contained in housing 220 with mechanical motion being transmitted through suitable contact rods which extend through the pipe 223 and into the operating box 224. The operating rods then extend upwardly from box 224 to the interrupters 203 and 205 in a suitable manner.

FIGURE 8 illustrates the manner in which three assemblies identical of that of FIGURE 7 can be carried from the common support frame 211 with common gas supply cabinet 221 and control housing 220. In FIGURE 8, components similar to those of FIGURE 7 are then given similar identifying numerals. Thus a plurality of identical interrupters 230, 231 and 232, each of which are at the live potential of the circuit, are connected electrically in series to form a single pole breaker suitable for operating at voltages from approximately 345 to 500 kv. Note that each of units 230, 231 and 232 are identical to the units of FIGURE 7.

Clearly, for use in 500 kv. circuits at high interrupting currents, four vertical stacks could be used with four series connected tanks. In the same way, various multiples of vertical stacks in series connected tanks might be used for various combinations of operating voltages and interrupting currents. In each case, the insulating column 210 is sized to suit the particular operating voltage.

FIGURE 8 additionally shows, for example, for the case of interrupter 230 the use of a capacitor 233 which can be used for dividing voltages between the series connected tanks. Connectors nad electrostatic shields such as shields 234 are utilized for connecting the tanks electrically.

Although this invention has been described with respect to preferred embodiments thereof, it should be understood that many variations and modifications will now be obvious to those skilled in the art, and it is preferred therefore that the scope of the invention be limited not by the specific disclosure herein but only by the appended claims.

The embodiments of the invention in which an exclusive privilege or property is claimed are defined as follows:

1. A high voltage circuit breaker comprising a main support tank, an interrupter structure having a generally tubular shape, a hollow insulator support column, a pair of cooperable contacts fixed to one end of said interrupter structure, blast valve means within said interrupter structure and mechanically connected to said pair of cooperable contacts, and operating means connected to said pair of cooperable contacts for operating said pair of cooperable contacts to a disengaged position and opening said blast valve; the opposite end of said interrupter structure being fixed at one end of said hollow insulator support; the interior of said interrupter structure communicating with the interior of said hollow insulator column; the opposite end of said insulator support being secured to said tank; said hollow insulator support being filled with high pressure gas; the interior of said tank being filled with low pressure gas; said blast valve being movable from a sealing position for sealing said high pressure gas within said hollow insulator column to said position permitting the flow of said high pressure gas through said cooperable contacts in said interrupter structure and into the interior of said tank; said cooperable contacts including a pair of stationary contacts and a bridging movable contact; said bridging movable contact being secured to said blast valve and being movable therewith.

2. The circuit breaker of claim 1 wherein said cooperable contacts are immediately adjacent and downstream of said blast valve with respect to the flow of said high pressure gas.

3. The circuit breaker of claim 1 wherein said stationary contacts are downstream of said blast valve with respect to the flow of said high pressure.

4. The circuit breaker of claim 3 wherein said pair of stationary contacts are surrounded by respective baffle means; said baffle means constricting the flow of said high pressure gas directly in the contacting areas between said bridging contact and said pair of stationary contacts and generally perpendicular to the arcs drawn between said stationary contacts and said bridging contact.

5. The circuit breaker of claim 4 wherein said blast valve has a skirt extending therefrom; said skirt having a first and second arcuate portion therein for directing the flow of high pressure gas directly toward said contacting areas.

6. An interrupter structure for a gas blast circuit breaker comprising an insulation housing, a stationary contact means, a movable contact, a blast valve, a cut-off valve and means for applying high pressure to said housing; said stationary contact means being connected to one end of said insulation housing; said movable contact being positioned adjacent said stationary contact means and being movable between an engaged and disengaged position with respect to said stationary contact means; said blast valve being secured to said movable contact; said cut-off valve being secured to said blast valve; said means for applying high pressure being connected to the other end of said interrupter housing; each of said blast valve and said cut-off valve being movable between closed positions and open positions; said high pressure gas being isolated from the interior region of the end of said insulation housing containing said stationary contact means when said blast valve and cut-off valve are in their said closed positions; said high pressure gas flowing toward said interior region when said blast valve and cut-off valve are in said open positions; said blast valve being closed and said cut-off valve being open when said movable contact is in its said engaged position; said blast valve being open and said cut-off valve being closed when said movable contact is in its said disengaged position; both of said blast valve and cut-off valves being open to permit blast action while said movable contact moves between its said engaged and disengaged positions; said stationary contact means positioned downstream of each of said blast valve and cut-off valve.

7. The interrupter structure of claim 6 wherein said stationary contact means is comprised of a first and second stationary contact; said movable contact comprising a bridging contact for engaging each of said first and second stationary contacts.

8. The interrupter structure of claim 6 wherein said cut-off valve is upstream of said blast valve and said blast valve is upstream of said stationary contact means.

9. The interrupter structure of claim 7 wherein said cut-off valve is upstream of said blast valve and said blast valve is upstream of said stationary contact means.

10. The interrupter structure of claim 9 wherein said first and second stationary contacts are surrounded by baffle means for restricting the flow of gas directly through the region of contact between said first and second stationary contacts and said movable contact.

11. The device as set forth in claim 6 which further includes operating means for operating said movable contact; said operating means including a spring connected to said cut-off valve for biasing said cut-off valve toward its said closed position and bellows means surrounding said spring means for isolating a portion of the surface opposite from said movable contact from said high pressure gas; and control valve means for admitting said high pressure gas into said bellows for operating said movable contact to its said disengaged position.

12. The device as set forth in claim 9 which further includes operating means for operating said movable contact; said operating means including a spring connected to said cut-off valve for biasing said cut-off valve toward its said closed position and bellows means surrounding said spring means for isolating a portion of the surface opposite from said movable contact from said high pressure gas; and control valve means for admitting said high pressure gas into said bellows for operating said movable contact to its said disengaged position.

13. The device as set forth in claim 9 which further includes a skirt on said blast valve; said skirt having a first and second arcuate portion therein for directing the flow of high pressure gas directly toward said stationary contact means.

14. The high voltage circuit breaker as set forth in claim 1 which includes a grounded support base; said tank connected and supported from said grounded support base.

References Cited
UNITED STATES PATENTS

| | | | |
|---|---|---|---|
| 2,824,937 | 2/1958 | Strom | 200—148 |
| 3,052,783 | 9/1962 | Buron | 200—145 X |
| 3,118,996 | 1/1964 | Forwald | 200—148 |
| 3,189,718 | 6/1965 | Tominaga | 200—148 |

FOREIGN PATENTS

| | | |
|---|---|---|
| 1,252,489 | 12/1960 | France. |
| 721,386 | 6/1942 | Germany. |

ROBERT S. MACON, *Primary Examiner.*